United States Patent [19]
Holloway, Jr.

[11] Patent Number: 6,109,827
[45] Date of Patent: *Aug. 29, 2000

[54] METHOD AND SYSTEM FOR FLOOD IRRIGATION

[76] Inventor: Rufus M. Holloway, Jr., 1616 Lake Shore Dr., Orlando, Fla. 32806

[*] Notice: This patent is subject to a terminal disclaimer.

[21] Appl. No.: 09/256,459

[22] Filed: Feb. 23, 1999

Related U.S. Application Data

[63] Continuation-in-part of application No. 08/906,757, Aug. 5, 1997, Pat. No. 5,993,111.

[51] Int. Cl.[7] ............................. A01G 25/16; E02B 13/00
[52] U.S. Cl. ............................... 405/39; 405/52; 47/66.1; 47/79; 47/1.01 T
[58] Field of Search ..................................... 47/65.5, 66.1, 47/79, 1.01 R, 1.01 F, 1.01 T; 405/36, 38, 39, 50, 52, 107, 108, 303

[56] References Cited

U.S. PATENT DOCUMENTS

| | | |
|---|---|---|
| 700,000 | 5/1902 | Patten . |
| 1,262,898 | 4/1918 | Wright . |
| 3,797,253 | 3/1974 | Rodieck . |
| 3,849,991 | 11/1974 | Niederwemmer . |
| 4,117,685 | 10/1978 | Skaife . |
| 4,268,993 | 5/1981 | Cunningham . |
| 4,431,338 | 2/1984 | Hornabrook . |
| 4,538,377 | 9/1985 | Thornton . |
| 4,576,511 | 3/1986 | Vidal, Jr. . |
| 5,009,029 | 4/1991 | Wittlin . |
| 5,160,214 | 11/1992 | Sakurai et al. . |
| 5,252,108 | 10/1993 | Banks . |
| 5,355,618 | 10/1994 | Pedersen . |
| 5,403,118 | 4/1995 | Davis et al. . |
| 5,409,510 | 4/1995 | Houweling . |
| 5,440,836 | 8/1995 | Lee . |

OTHER PUBLICATIONS

Wesley M. Jarrell, Subirrigated Pots Mean Healthy Roots and Healthy Returns, Sep., '91; pp. 60–71, Grower Talks.
Stephen Swanson, From the Bottom Up, Farwest Magazine, pp. 51–52, Aug., 1996, vol. 40.

*Primary Examiner*—Eileen D. Lillis
*Assistant Examiner*—Tara L. Mayo
*Attorney, Agent, or Firm*—Robert L. Wolter; David G. Maire; Holland & Knight LLP

[57] ABSTRACT

The system includes a plurality of flood plains. Each flood plain contains a plurality of plants and each plant is held in a pot. The flood plains are excavated at different elevations from an upper most elevation to a lower most elevation. The flood plains are sequentially flooded for a resident time period with a selected volume of water directed from a water source. As the flood plains are excavated to different elevations, gravity, and a series of flood gates, control the water flow from one flood plain to a next lower flood plain. Each flood plain has a top surface and an underlying bed comprising a soil and clay composition. The surface of each bed is contoured to adequately drain water from one flood plain to the next. This clay mixture firms the bed to adequately support vehicles and laborers to prevent depressions in the bed which may adversely affect water flow in and out of a flood plain. Each of the flood plains is lined with a water impermeable membrane. The flood plains are also contoured to effectively drain water from one flood plain to the next. A water reclamation system is connected to the irrigation system. Water drained from the flood plains is collected in a retention pond and pumped to a holding pond. The water in the holding pond or reservoir is used to flood the irrigation field.

23 Claims, 10 Drawing Sheets

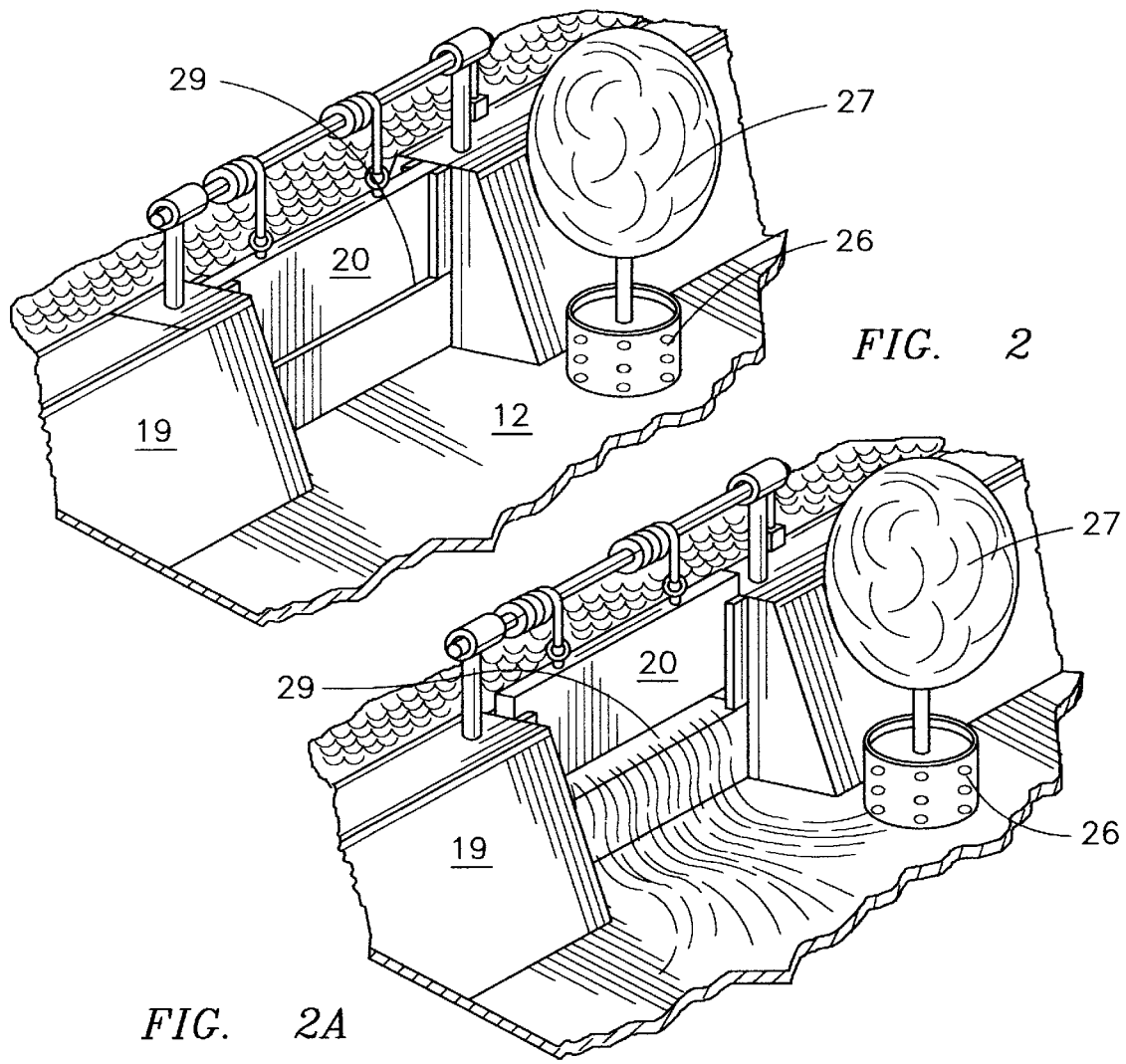
FIG. 2
FIG. 2A
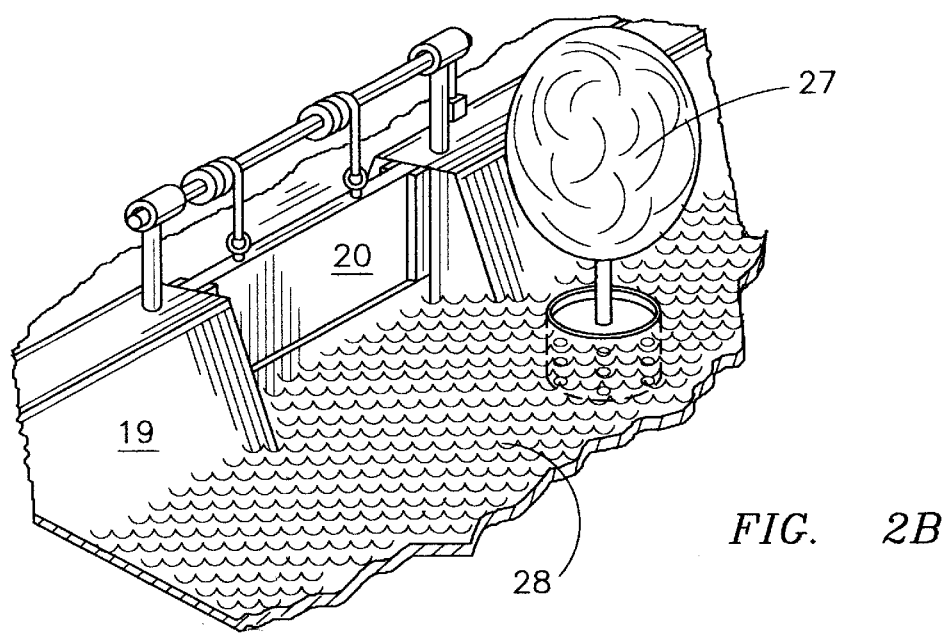
FIG. 2B

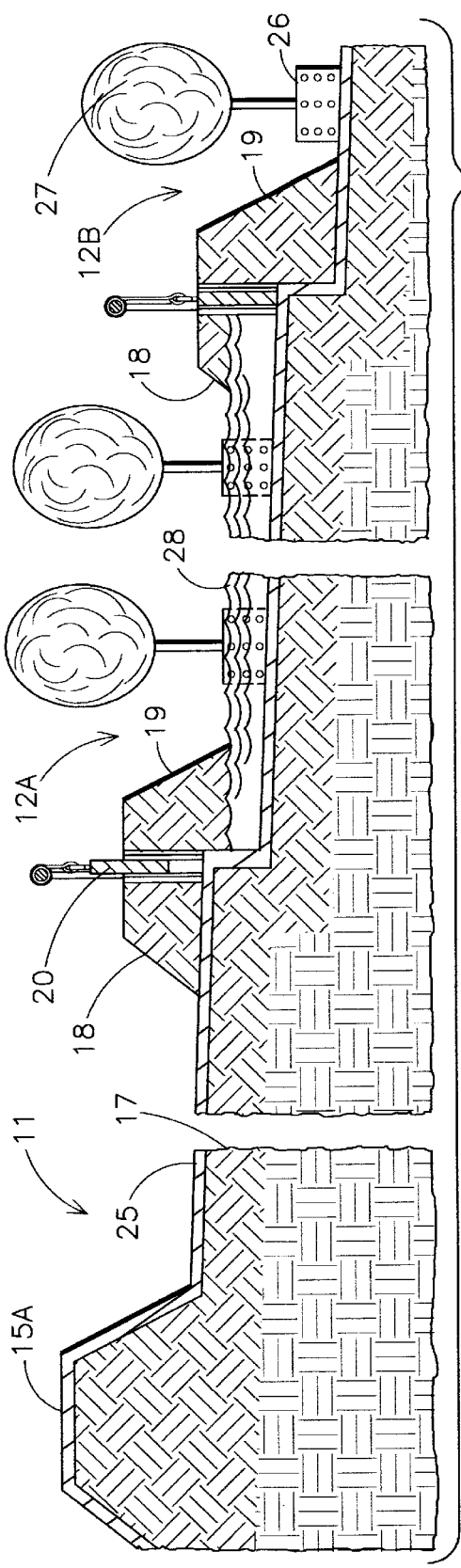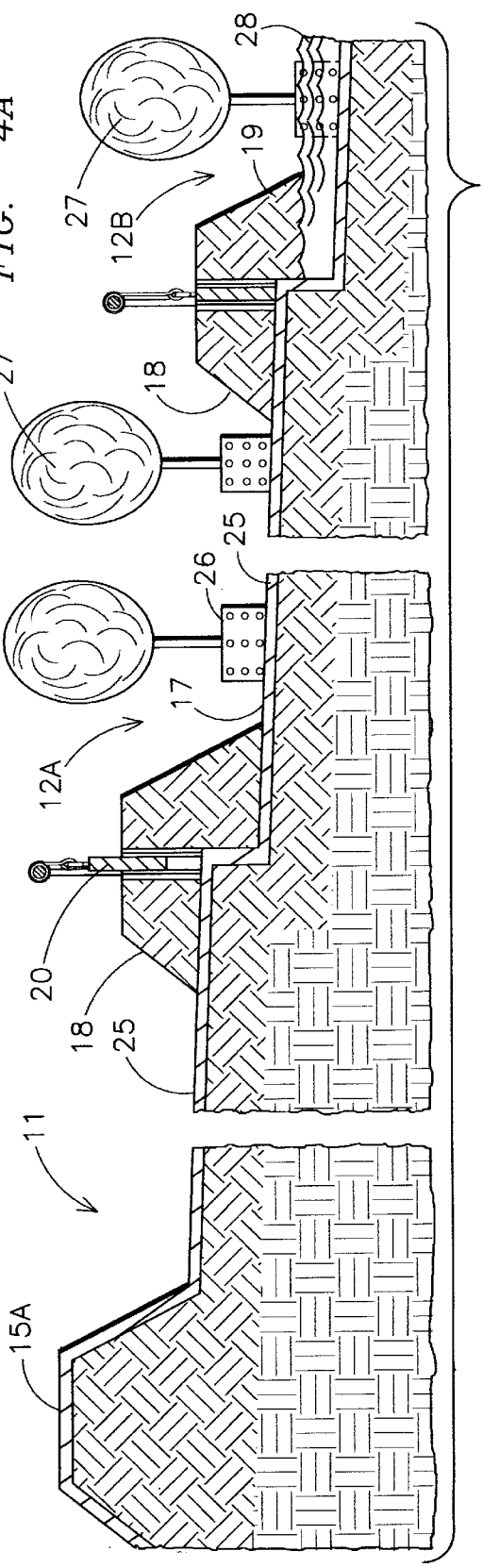

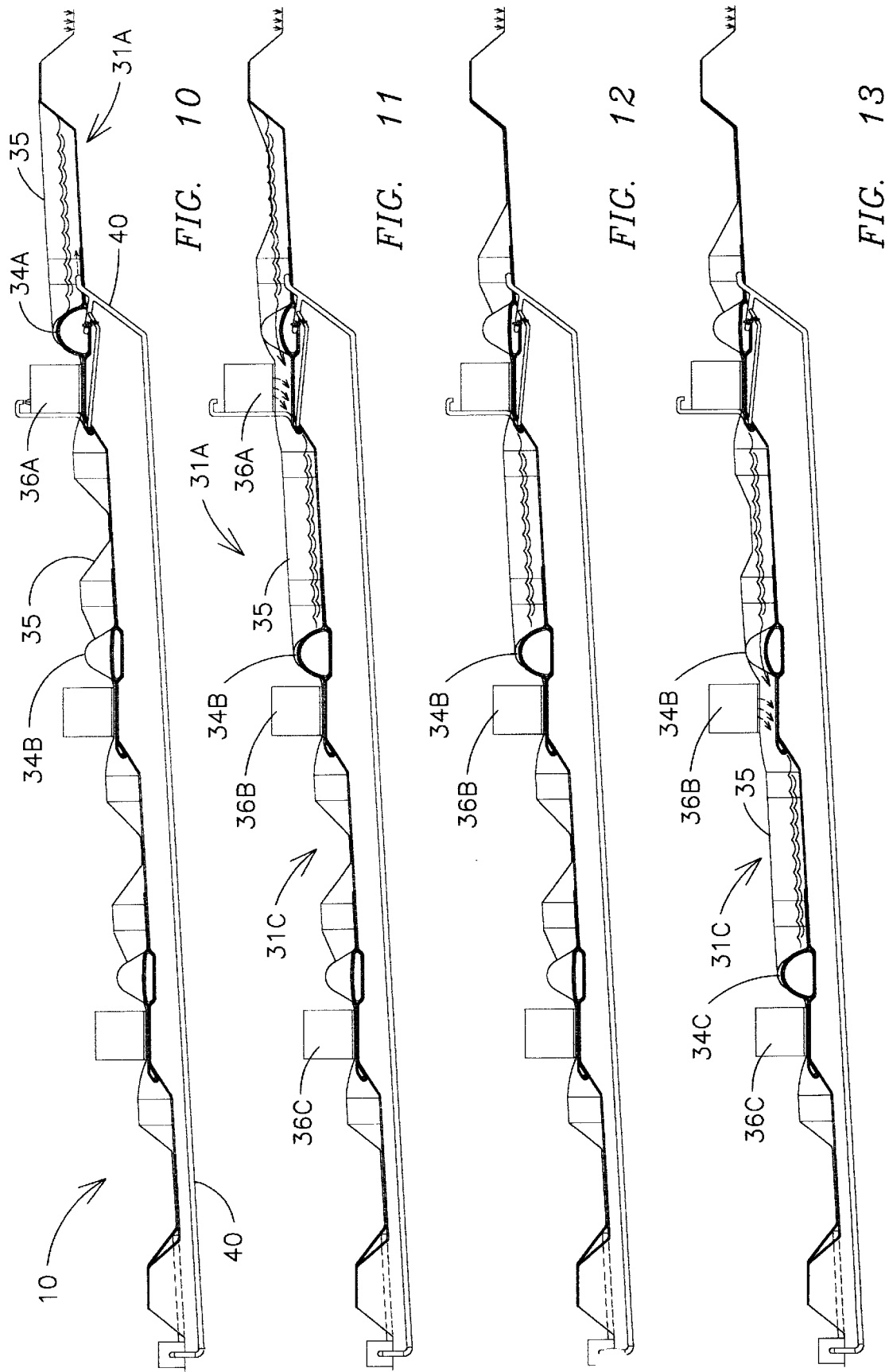

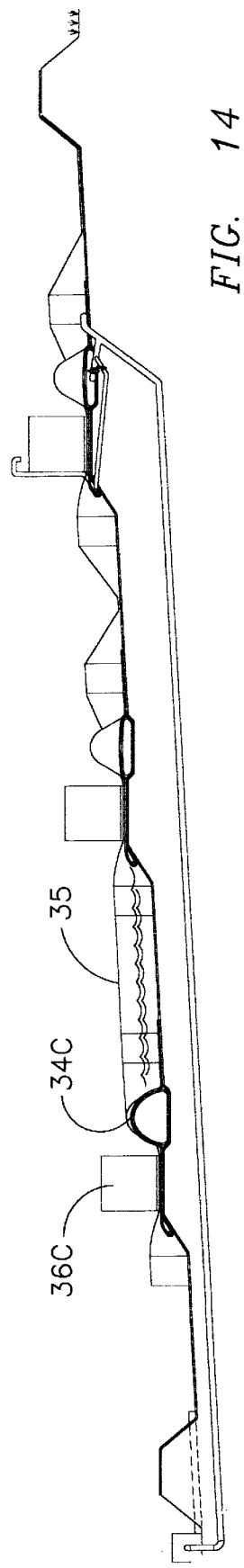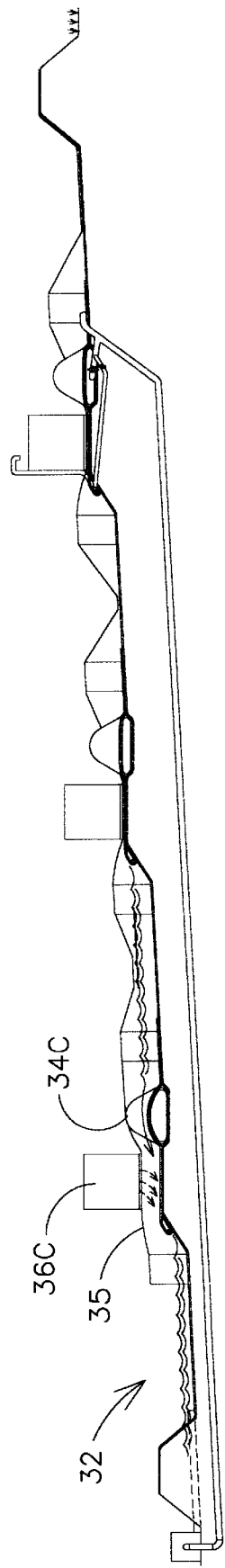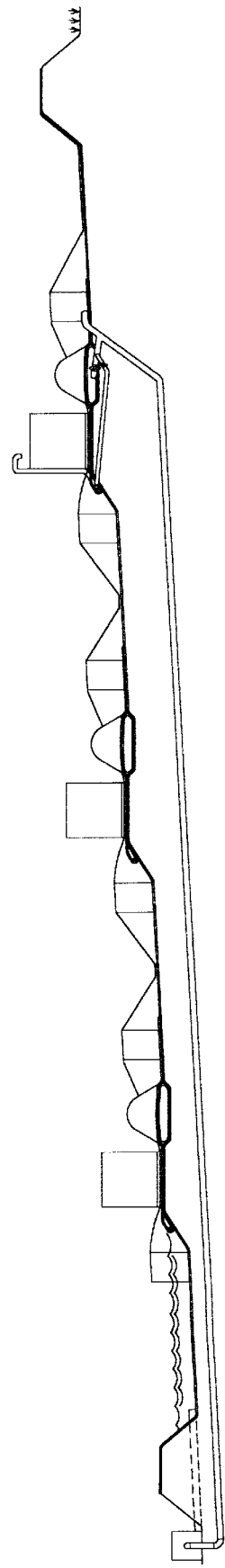

TO NEXT
VALVE

METHOD AND SYSTEM FOR FLOOD IRRIGATION

This is a continuation-in-part of pending application 08/906,757, filed Aug. 5, 1997, now U.S. Pat. No. 5,993,111.

FIELD OF THE INVENTION

This invention relates to irrigation methods and techniques. More specifically, this invention pertains to techniques and systems employing flood irrigation.

BACKGROUND OF THE INVENTION

Various irrigation methods and systems are incorporated for use in various industries as nurseries or farming. Plants as ornamental trees as crepe myrtles, oak trees, magnolia trees, crop seedlings or other plants are often grown in controlled situations. These types of plants are usually sold at an early stage in their life cycles, so nurseries maintain seedlings or saplings which are smaller than mature plants. As a result, these nurseries are able to maintain large volumes of plants in a limited amount of space. In as much as these plants are being handled at early stages of their life cycles, proper care is critical and necessary to maintain the plants.

Various methods of irrigation may be used to supply water to the plants. One such irrigation technique utilizes overhead sprinklers. An overhead sprinkler system may fail to uniformly distribute water to all plants. While overhead sprinkler systems may be less expensive to operate, these systems are very expensive to install.

Another irrigation method often used is a water bubbling system that employs drip hoses and pipes. Elongated pipes are placed adjacent a row of plants and water bubbles through an aperture in the hose adjacent a plant. This may provide a more uniform distribution of water than overhead sprinkler systems; however, these systems are labor intensive and expensive to maintain. Each source of water must be monitored to insure water is distributed from the apertures to the plants.

SUMMARY OF THE INVENTION

It is an object of this invention to provide a system and method for irrigation that efficiently distributes water to a plurality of plants, and is cost effective. Another objective of this invention is to provide a flood irrigation system and method that utilize a water reclamation system.

These and other objectives are achieved by employing the present novel flood irrigation method and system. The system includes a plurality of flood plains. Each flood plain contains a plurality of plants and each plant is held in a pot. The flood plains are excavated at different elevations from an upper most elevation to a lower most elevation. The flood plains are sequentially flooded for a resident time period with a selected volume of water directed from a water source. As the flood plains are excavated to different elevations, gravity, and a series of flood gates, control the water flow from one flood plain to a next lower flood plain.

Each flood plain has a top surface and an underlying bed comprising a soil and clay composition. The surface of each bed is contoured to adequately drain water from one flood plain to the next. This clay mixture firms the bed to adequately support vehicles and laborers to prevent depressions in the bed which may adversely affect water flow in and out of a flood plain. Each of the flood plains is lined with a water impermeable membrane. The flood plains are also contoured to effectively drain water from one flood plain to the next.

A water reclamation system is connected to the irrigation system. Water drained from the flood plains it is collected in a retention pond and pumped to a holding pond. The water in the holding pond or reservoir is used to flood the irrigation field.

In one embodiment a plurality of flexible and inflatable dikes are disposed along the irrigation system whereby a dike is disposed between consecutive flood plains. The dikes are placed in fluid communication with the reservoir and each other. A conduit interconnects the dikes to drain and fill consecutive dikes with water from the reservoir. In addition, a valve mechanism is disposed along the conduit below each dike to retain water in the dike and inflate the dike for retention of water in the flood plain immediately above the dike.

As water is drained or pumped into the top flood plain, the dike on the top flood plain simultaneously inflated with water to retain water in the top flood plain. In addition, water is also drained or pumped to a valve mechanism in the second flood plain to close the dike for inflation of the dike on the second flood plain. Once a selected volume of water has flooded the flood plain for a resident time, the valve mechanism opens the conduit and water from the first dike is drained to the dike on the second flood plane to inflate the same. As the first dike deflates, water in the top flood plain spills over the dike into the second flood plain where the selected volume of water is retained for a resident time. This process is repeated until the selected volume of water is drained to the retention pond.

BRIEF DESCRIPTION OF THE DRAWINGS

FIG. 2 is an expanded view of an upper flood plain and lower flood plain.

FIG. 2A is a view of the flood gate opened flooding a lower flood plain.

FIG. 2B is a view of the lower flood plain flooded with water from of the upper flood plain.

FIG. 4 through 4B is a sectional of the irrigation system taken along line 4—4 showing the sequential flooding of consecutive flood plains.

FIGS. 10 through 16 is a side sectional view of the invention showing irrigation of the flood plains from the top flood plain 31A to the reservoir.

DETAILED DESCRIPTION OF THE DRAWINGS

Figure 1:
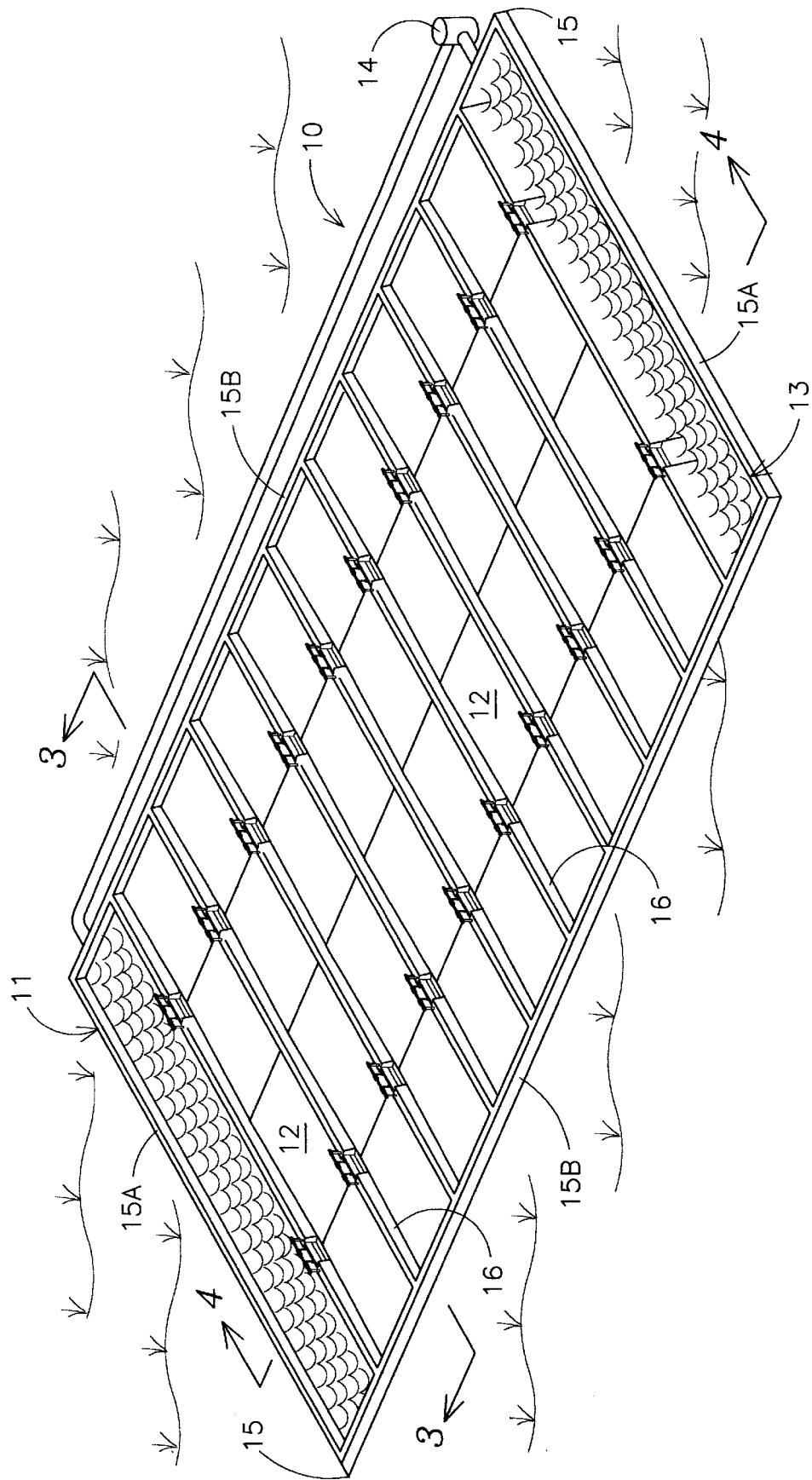
FIG. 1 is a perspective view of the present flood irrigation system.
Figure 3:
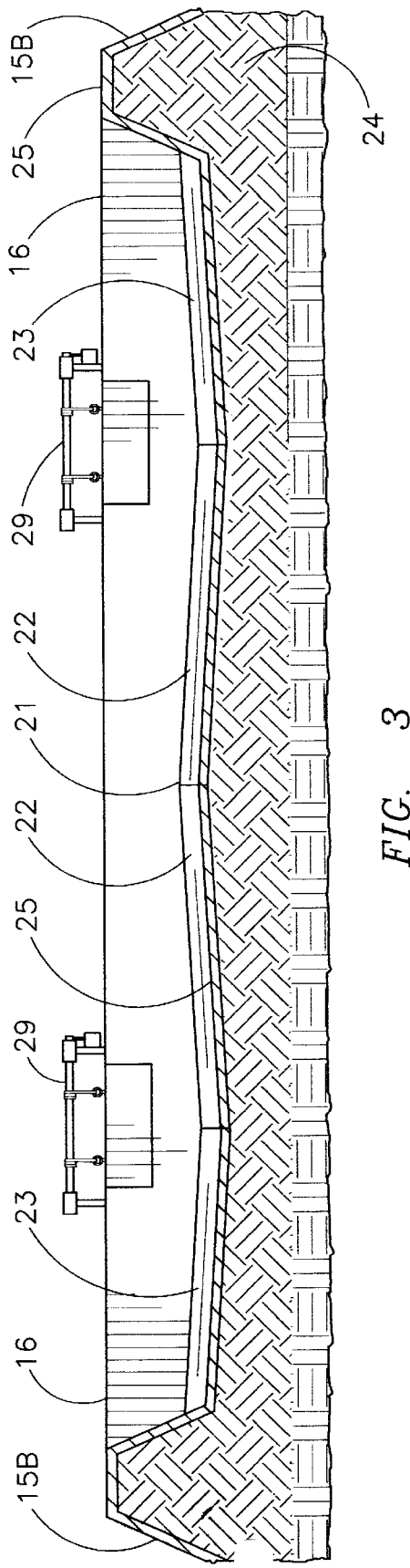
FIG. 3 is a sectional view of the flood irrigation system taken along line 3—3 in FIG. 1.

A flood irrigation system 10 is depicted in FIG. 1 which incorporates the method for flood irrigation that is the subject invention. The irrigation system 10 in the embodiment shown in FIG. 1 is excavated to generally form an overall gradient, and includes a reservoir pond 11 for a water source, a plurality of flood plains 12 for holding potted plants and water, a retention pond 13 for collecting water drained from the flood plains 12 and a pump system 14 for reclaiming water from the retention pond 13 to the reservoir pond 11. The reservoir pond 11, flood plains 12 and retention pond 13 are excavated at different elevations so that water flow from the reservoir 11, through the flood plains 12 and to the retention pond 13 is controlled largely by gravity.

The embodiment of the invention illustrated in FIG. 1 has a dike system that includes a plurality of dikes that serve to hold water within the flood plains and separate consecutive or adjacent flood plains 12. The flood plains 12, as well as the reservoir pond 11 and retention pond 13 in this embodiment, are surrounded by a perimeter dike 15. Interior dikes 16 extend from side to side of the perimeter dike 15 dividing an excavated area into the reservoir pond 11, flood plains 12 and retention pond 13. The flood irrigation system shown in FIG. 1 is constructed in a rectangular figure. The perimeter dike 15 has two end dikes 15A and two side dikes 15B. The flood plains 12 extend parallel to one another. Accordingly, the flood plains 12 are excavated in a stepped design along the gradient between an upper most elevation occupied by the reservoir 11, and a lower most elevation occupied by the retention pond 13.

Figure 4:
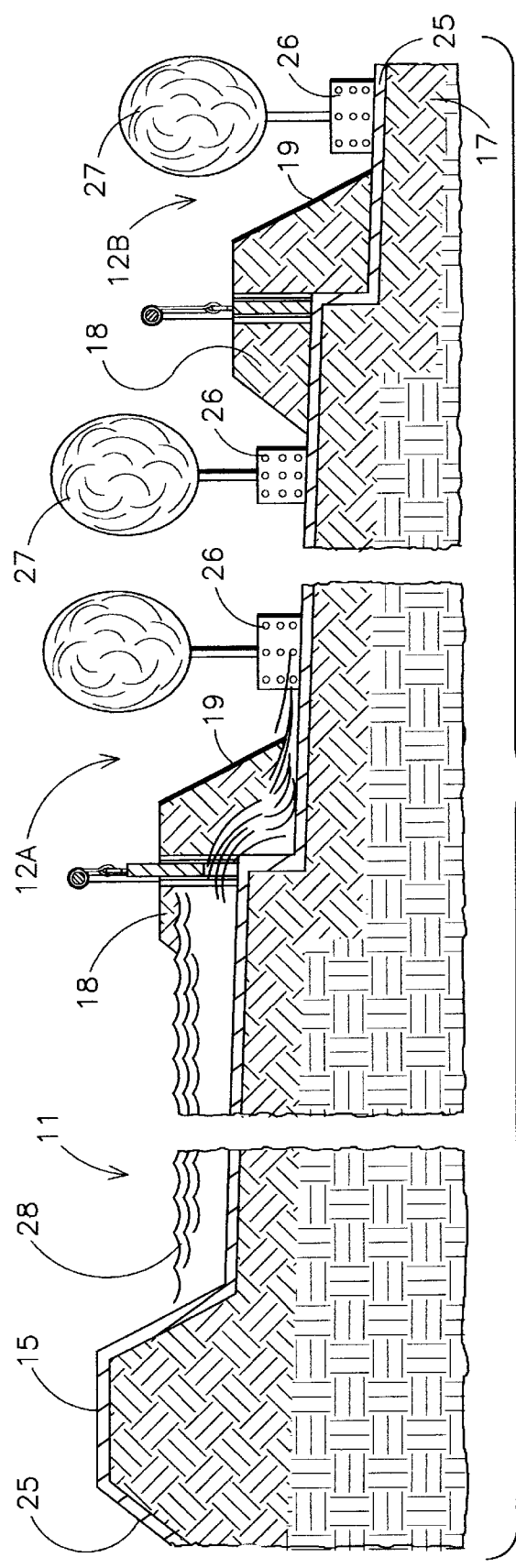

As illustrated in FIGS. 4, 4A and 4B, consecutive flood plains 12A and 12B share interior dike 16. Each interior dike 16 may be separated into two dikes which are identified as an egress dike 18 for the upper flood plain 12A and an ingress dike 19 for the lower flood plain 12B. The flood plain 12 includes top surface having an underlying bed 17 which are bordered at sides by an ingress dike 19, an egress dike 18 and the dikes 15B and 15B (shown in FIG. 1).

As shown in FIG. 4, the top and surface and bed 17 of each of the flood plains 12A and 12B are sloping or inclined downward from the egress dike 18 to the ingress dike 19. The pitch or angles of the surface of the bed 17 of the flood plains 12 may vary depending on numerous factors such as the overall size of the irrigation system, the soil texture, the size of each flood plain 12 and the overall gradient of the irrigation system from the top to bottom. A spillway 29 (also shown in FIGS. 2, 2A and 2B) connects the upper flood plain 12A to the lower flood plain 12B. A flood gate 20 is mounted in the spillway 29 and is adjustable to open and close the spillway 29 for water to flow from the upper flood plain 12A to the lower flood plain 12B.

With respect to FIGS. 4, 4A and 4B, the steppe design is illustrated between two consecutive flood plains 12A and 12B, and the reservoir pond 11. The difference in the elevation in the flood plains 12A and 12B will vary depending on the size of the irrigation system 10 constructed. In a large scale system that includes flood plains 12 over twenty acres, the flood plains 12 may be as long as six hundred feet long and ninety feet wide. The difference in elevation between consecutive flood plains in such a case may be approximately two to three feet. The elevation of the flood plain 12 and bed 17 may drop about six inches from the ingress dike 19 to the egress dike 18.

In addition to the surface of the flood plain 12 sloping downward from an egress dike 18 to an ingress dike 19, the surface of the flood plain 12 also has transversely inclined surfaces 22. The flood plain 12 has a median 21, centered between the side dikes 15B. The median 21 is about the same elevation of the flood plain 12 at the points where the flood plain 12 meets the side dikes 15B. The surfaces 22 are inclined downward from the median 21 to approximately a centerline of the flood gate 20. The surfaces 23 extend downward from the dikes 15B toward the surfaces 22 forming a funnel-like surface on the bed 17 for controlling the flow of the water in and out of the flood plain 12.

A water impermeable membrane 25 covers the entire surface of the flood plain 12 and the dikes 15 and 16. The membrane 25 seals the flood plains 12 and prevents erosion of the underlying soil. The soil is preferably treated with a clay mixture to form a firm soil top layer 24. This top layer 24 prevents depressions forming in the bed 17 which may restrict water flow.

The operation of the system is shown in FIGS. 2 through 2B and FIGS. 4 through 4B. In FIG. 4, the reservoir 11 as serves a water source for the flood plains 12A and 12B. As shown in FIGS. 2, 2A and 2B, the flood plains 12 have a plurality of pots 26 11 for holding plants 27. Each of the pots 26 has holes so water may penetrate the pot 26 and irrigate the plants 27. The flood plains 12 are flooded in sequence with a selected volume of water 28 from the reservoir pond 11. The flood gates 20 between the reservoir pond 11 and the flood plain 12A are raised and water 28 drains into the flood plain 12A. The volume of water 28 may depend on the desired water level within each flood plain 12. The pots 26 should be large enough and the water level should not be so high to topple the pots 26. In addition, the flow rate of the water 28 should be slow enough to prevent toppling the pots.

The water 28 is held in the flood plain 12 for a resident time sufficient to irrigate the plants 27 within the pots 26. The amount of time the water 28 will remain in each flood plain 12 is determined in part by the type of plant 27 in the pots 26. One skilled in the art may be able to determine the resident time without undue experimentation.

When the water 28 is drained from an upper flood plain 12A to the lower flood plain 12B, the flood gate 20 remains open as well as flood gates 20 between consecutive dry flood plains 12 so that rain water may drain through the system. Of course, the flood gate 20 for a flood plain 12 retaining water must remain closed, but the level of the water is monitored to drain excess water as necessary. In addition, the water level is monitored to avoid undue loss of water 28 resulting from evaporation or absorption by the plants. The water 28 in a flood plain 12 may be supplanted as necessary to maintain an adequate water level.

After each of the flood plains 12 has been flooded, the water 28 is drained into the retention pond 13. A pump system 14 pulls water from the pond 13 and directs the water 28 back to the reservoir 11 where it is recycled through the irrigation system 10. The retention pond 13 is preferably larger than the reservoir pond 11 and may be able to hold up to five times, or greater, the volume of water as the retention in order to replenish the water supply in the reservoir pond 12 or the flood plains 12.

The retention pond 13 is made larger so that excessive rainwater may be collected in the retention pond 13 and used in the irrigation system 10.

The FIGS. 5 through 17 illustrate the design and function of a second embodiment of the invention. The flood irrigation system 10 depicted in FIG. 5 incorporates the method for flood irrigation that is the subject of this invention. As in the first embodiment, the flood irrigation system 10 is comprised of a plurality of downward-sloping flood plains 31, where each consecutive flood plain 31 is excavated at a lower elevation than the preceding flood plain 31 so that the water flow through the irrigation system 10 is due in part to gravity. The flood irrigation system 10 extends from a top flood plain 31A located at the highest elevation to a retention pond 32 located at the lowest elevation. The bottom of each flood plain 11 is lined with a water impervious membrane 33 to avoid water loss.

The second embodiment of the flood irrigation system 10 contains a dike system comprising a plurality of flexible and inflatable dikes 34 wherein each dike 34 is disposed between consecutive flood plains 31. With respect to FIGS. 5, 6 and 7, the dike 34 on each flood plain 31 is disposed toward a bottom of the inclined surface of the flood plain 31 adjacent a lower consecutive flood plain 31. The dikes 34 are expandable in the sense the dikes are inflatable to a height sufficient to retain water in a flood plain 31 above the dike 34, and deflatable to allow water to flow over the deflated dike 34, from an upper flood plain to a lower consecutive flood plain. Water is used to inflate the dikes 34. A series of conduits 35, in fluid communication with the dikes 34, interconnect the dikes 34 to sequentially inflate dikes 34, as water simultaneously flows from an upper flood plain to an adjacent lower flood plain over a deflated dike 34. In addition, a plurality of valve mechanisms 36, are disposed adjacent the junction of the dikes 34 and conduits 35, are operationally linked with the drainage of water between consecutive flood plains to control the flow of water between consecutive dikes 34.

Figure 6:
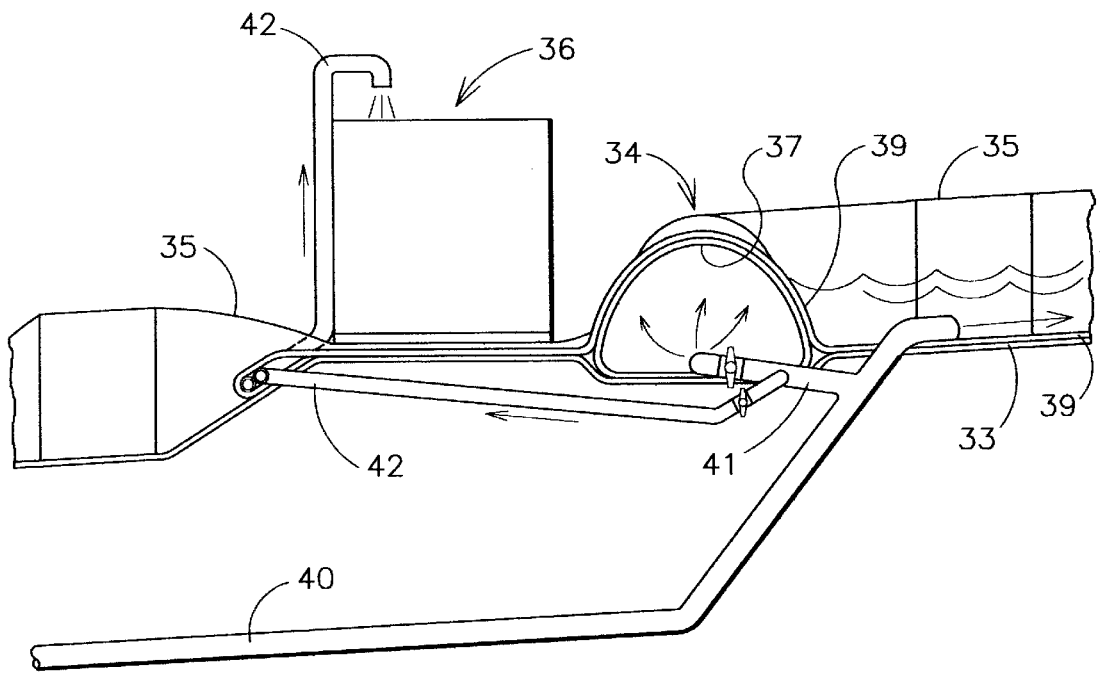
FIG. 6 is a side sectional view of the flood plain 31A.
Figure 7:
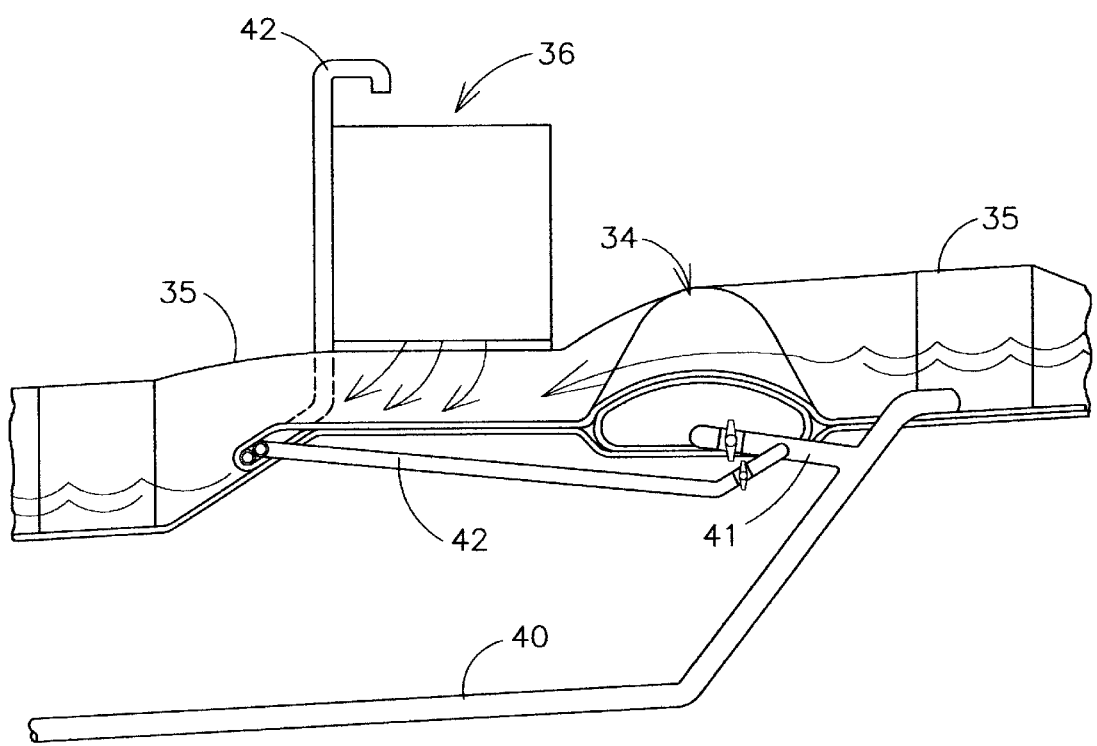
FIG. 7 is a side sectional view of the flood plain 31A.
Figure 8:
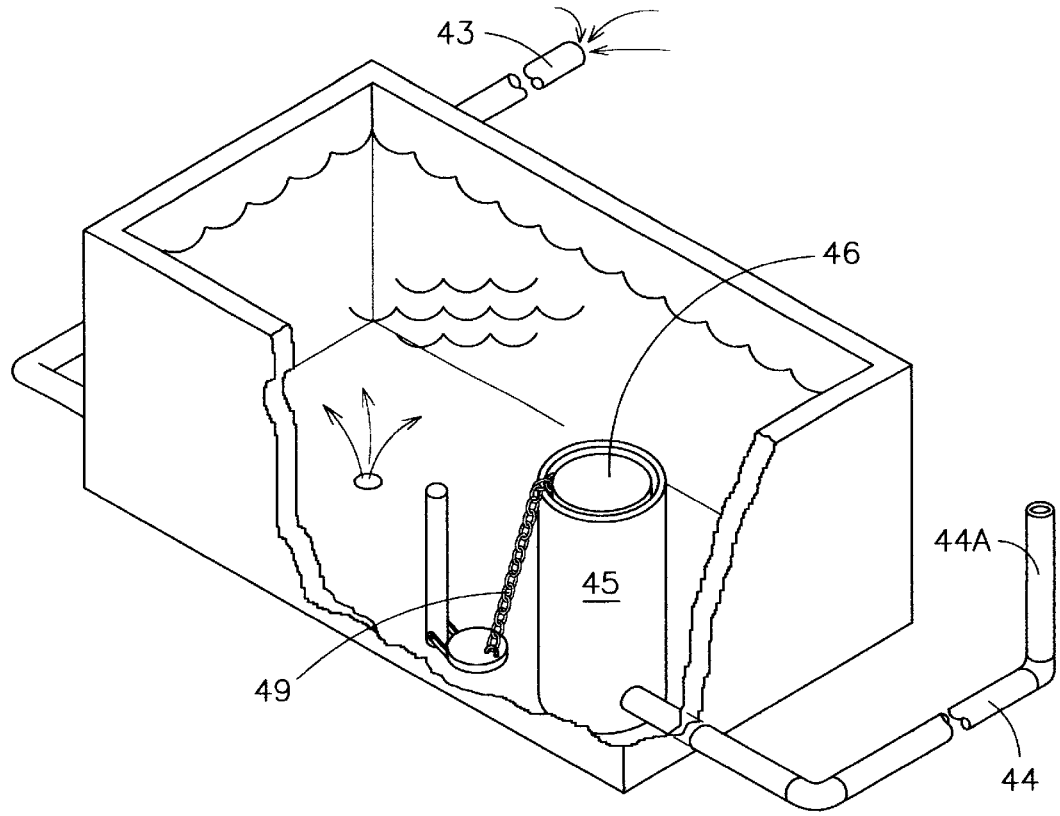
FIG. 8 is a perspective view of the valve mechanism of the invention.
Figure 9:
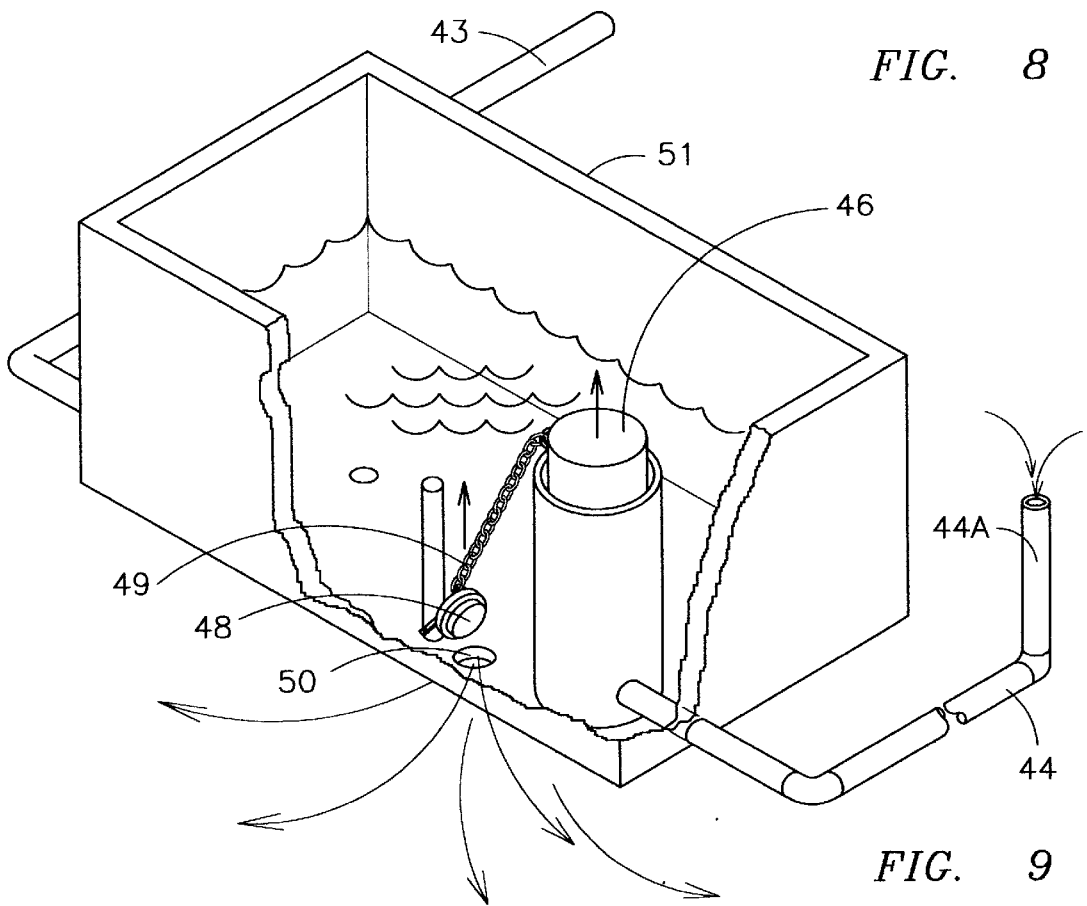
FIG. 9 is a perspective view of the valve mechanism of the invention.

With respect to FIGS. 6 and 7, a sectional view of a dike 34 is illustrated. The dike 34 comprises a flexible water impermeable material folded onto itself to form a duct 37 through which water flows. The duct 37 is disposed within a furrow 38 that extends the length of the flood plain 31. The membrane 33 also lines the furrow 38, and the duct 37 is placed on the membrane 33 within the furrow 38. A sheath 39, of similar texture of the membrane 33, attaches to the membrane 33 and extends over the duct 37. As water flows from an upper flood plain, over a deflating dike 34, to a lower flood plain 31, the sheath 39 prohibits water from submerging the duct 37 which may cause the duct 37 to float and adversely effect the water flow through the dike 34, and from an upper flood plain to a lower flood plain.

In order to more clearly explain the details of the invention the top flood plain is designated as 31A, and the lower or second flood plain shall be designated 31B. The dikes and valve mechanisms shall have similar designation corresponding to the appropriate flood plains. For instance the dike 34B is disposed along the bottom of the flood plain 31B, and the valve mechanism 36B is similarly disposed on the second flood plain 31B to control the water flow into the dike 34B. The dike 34B will inflate when the valve mechanism 36B is closed to retain water in the dike 34B, and retain water in the flood plain 31B.

Figure 5:
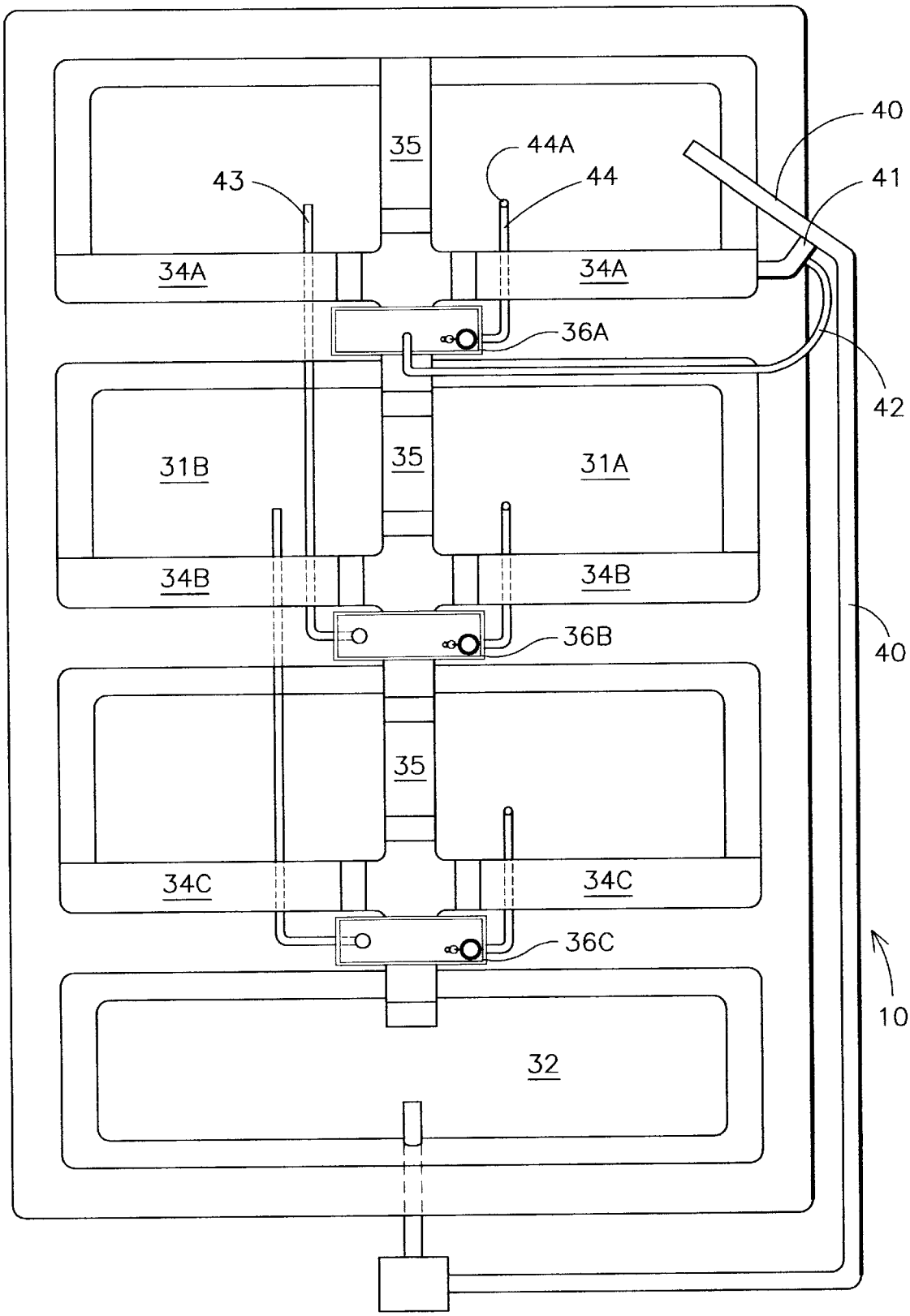
FIG. 5 is a top view of a second embodiment of the invention.

The FIGS. 5 and 6 also illustrate a conduit 35 in fluid communication with the dike 34A. A valve mechanism 36A is shown in FIG. 6 in a closed position restricting flow from the dike 34A and conduit 35 in the top flood plain 31A to the conduit 35 and dike 34B in the second flood plain. The FIG. 7 is an illustration of the valve mechanism 36A in an open position and the dike 34A deflated. Water within the dike 34A has drained into the dike 34B on the second flood plain 31B. As the dike 34A gradually deflates, water maintained in the top flood plain 31A flows over the deflated dike 34A and into the flood plain 31B.

Referring again to FIGS. 5 and 6, there is shown the top flood plain 31 in fluid communication with the retention pond 32 via the pump and main line 40. The top flood plain 31A is first flooded with water pumped from the retention pond 32 through a main pipe 40 which empties into the top flood plain 31A. A secondary pipe 41 draws from the main pipe 40 to fill the dike 34A on the first flood plain 31A. A tertiary pipe 42 also draws from the main pipe 40 and empties into the valve mechanism 36. Thus the top flood plain 31A and dike 34A are simultaneously filled.

The valve mechanisms 36 are operationally linked with the flow and drainage of water from flood plain to flood plain. As the valve mechanism 36A of the top flood plain 31A fills with water, it applies a downward pressure on the conduit 35 below the dike 34A on the top flood plain 31A, thereby preventing water from flowing out of the dike 34A of the top flood plain 31A. Before the dike 34A of the top flood plain 31A fills with water, the dike 34A of the top flood plain 31A inflates, forming a barrier that prevents the water from leaving the top flood plain 31A which is simultaneously being filled. Once the dike 34A fills to capacity, the flood plain 31A continues to fill to a predetermined level with a selected volume of water.

Figure 17:
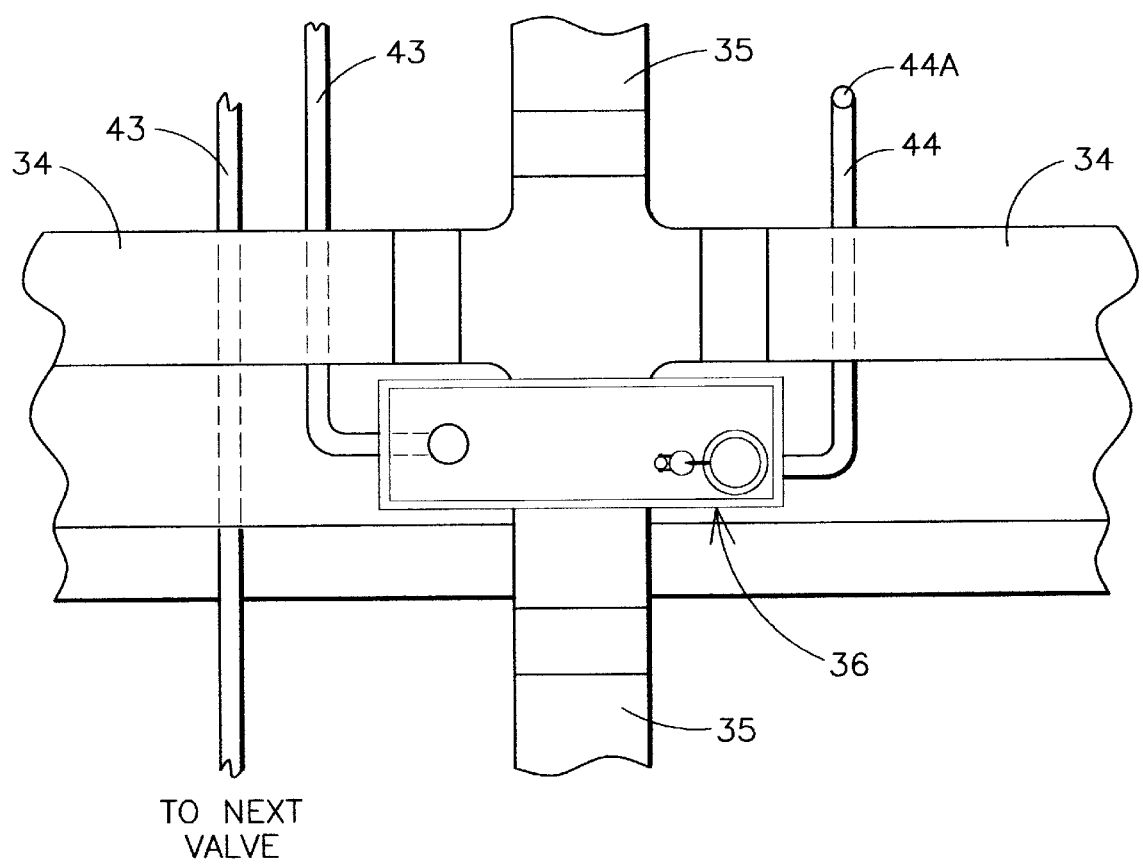
FIG. 17 is a top view of the valve mechanism, conduit and dike on a flood plain.

Referring now to FIGS. 5 and 17, a valve-fill pipe 43 extends from each flood plain 31 to a valve mechanism 36 on the consecutive flood plain 31 at a lower elevation. As the top flood plain 31A fills with water, water is transported from the top flood plain 31A to the valve mechanism 36B via a valve-fill pipe 43. The valve mechanism 36B of the next consecutive flood plain 31B is located below the intersection of the dike 34B and conduit 35 the next consecutive flood plain 31B. As the valve mechanism 36B of the second flood plain 31B fills with water, it applies a downward pressure on the expandable dike system just below the intersection of the dike 34B and conduit 35. Thus when the valve mechanism 36A is opened water flows from dike 34A through the conduit 35 into the dike 34B on the second flood plain. The valve mechanism 36B having been activated closes the conduit 35 below the second dike 34B which inflates with water in anticipation of water emptying from the top flood plain 31A and spilling into the second flood plain 31B.

Referring now to FIGS. 6–9, the operation of the valve mechanism is shown in more detail. The valve mechanism 36 is opened by a flushing apparatus. The valve mechanism 36 includes a housing 51, and a vertically disposed cylinder 45 is mounted on the floor of the housing 51 and holds a float 46. The float 46 is linked to a plug 48 by chain 49. The plug 48 closes a drain-hole 50 in the bottom of the valve mechanism housing 51.

A second valve-fill pipe 44 extends from the flood plain 31 to the cylinder 45 within the housing 51 of the valve mechanism 36. The valve-fill pipe 44 has a vertical extension 44A. As water filling a flood plain 31 reaches a depth equal to or greater than the height of the vertical extension 44A, water pours into the vertical extension 44A. The water is directed into the housing 51 and rises within the cylinder 45. The float 46 rises concomitantly with the water, and the chain 49 pulls open the plug 48 opening the drain-hole 50. Water then drains from the valve mechanism 36 through the drain hole 50.

The water having drained from the housing 51 of the valve mechanism 36, the water within the dike 34 forces the valve mechanism open and drains through the conduit 35 to the dike 34 on the adjacent flood plain at the lower elevation. The dike 34A of the top flood plain 31A deflates, while the dike 34B of the next consecutive flood plain inflates. With the barrier thus deflated, water from the top flood plain 31A flows downhill to the next consecutive flood plain 31B, where it is prevented from flowing further downhill by the now inflated intermediate dike 34B of the next consecutive flood plain.

Referring now to FIGS. 10–16, this process is repeated for each consecutive flood plain 31 until water reaches the retention pond 32. As shown in FIGS. 10 and 11, as water drains from the top flood plain 31A into the second flood plain 31B, the valve mechanism 36B has been filled and the dike 34B is inflated to retain water in the second flood plain 31B. As water drains into the second flood plain 31B, the valve mechanism 36C on the third flood plain 31C is filled with water via the first valve-fill pipe 43 extending from the second flood plain 31B to the third valve mechanism 36C. With respect to FIGS. 11, 12 and 13, as water fills the second flood plain 31B, the water reaches a level above the vertical extension 44A on valve-fill pipe 44. As water pours into the second valve-fill pipe 44, water is directed to the valve mechanism 36B on the second flood plain 31B. The flushing apparatus is activated and the water drains from the valve mechanism 36B. Water within the conduit 35 and second dike 34B then drains to the dike 34C and conduit 35 on the third flood plain 31C.

As the dike 34B deflates, water in the second flood plain 31B begins to cascade over the deflating dike 34B and drains into the third flood plain 31C. In as much as the deflation of the dikes is due to water drainage into other dikes, the deflation is a gradual process. Accordingly, the gradual deflation of the dike 34 in part controls the flow rate of the water from an upper flood plain to a lower flood plain. A dramatic deflation of the dike 34 may cause a significant flow rate that could topple plants and/or erode soil from the pots as it pours into the flood plain. This sequential flooding of the flood plains is repeated through the irrigation system 10 until the water is drained into the retention pond 32 as shown in FIGS. 11 and 12. The pump system 14 directs the water back to the top flood plain 31A via the main pipe 44 in order to initiate the process again.

While I have disclosed the preferred embodiment of my invention, it is not intended that this description in any way limits the invention, but rather this invention should be limited only by a reasonable interpretation of the now recited claims.

Having described my invention, what I claim as new and desire to secure by letters patent is:

1. A flood irrigation system, comprising:
   (a) a plurality of flood plains;
   (b) a water source in communication with said flood plains; and
   (c) means, connected to said irrigation system, for sequentially flooding the plurality of flood plains with a single volume of water from the water source, and each said flood plain being flooded sequentially for a resident time with the single volume of water.

2. A method for flood irrigation, comprising the steps of:
   (a) providing a plurality of flood plains, each said flood plain having a plurality of plants therein;
   (b) providing a water source for flooding said flood plains; and
   (c) sequentially flooding said flood plains with a single volume of water from said water source wherein each said flood plain is flooded sequential with said single volume of water for a resident time.

3. A flood irrigation system, comprising:
   a) a plurality of flood plains having therein a plurality of plants, said plurality of flood plains having a first flood plain excavated at a given elevation and said remaining flood plains excavated at consecutively lower elevations with respect to said first flood plain;
   b) a water impermeable membrane disposed over each said flood plain; and,
   c) means, in fluid communication with a water source, for flooding said first flood plain with a selected volume of water from said water source and retaining said selected volume of water for a resident time, and consecutively flooding each said remaining flood plain with said selected volume of water for a resident time.

4. A flood irrigation system as defined in claim 3 wherein said flooding and water retaining means includes a plurality of dikes having a dike extending laterally between each of a pair of consecutive flood plains.

5. A flood irrigation system as defined in claim 4 wherein said dikes include a plurality of ducts and each said duct is formed from a flexible material folded onto itself, and means in fluid communication with said water source for sequentially inflating said dikes with a selected volume of water for retaining water in said flood plains and deflating said dikes for flooding consecutively lower flood plains.

6. A flood irrigation system as defined in claim 5 wherein said flooding and water retaining means further includes a plurality of conduits interconnecting said dikes and providing said plurality of dikes with a fluid communication, and a valve disposed on said conduits adjacent each said dike and means for actuating said valve, for inflating or deflating said dike.

7. A flood irrigation system as defined in claim 6 further including a means, in fluid communication with said flood plains and dikes, for reclaiming said selected volume of water for flooding said flood plains and for inflating said dikes to retain water in said flood plains.

8. A flood irrigation system as defined in claim 7 wherein said means for reclaiming includes a retention pond excavated at an elevation lower than the lowest elevation of said flood plains, and said water source from which said selected volume of water is taken, is held in said retention pond.

9. A flood irrigation system, comprising:
   a) a plurality of flood plains having therein a plurality of plants, said plurality of flood plains having a first flood plain excavated at a given elevation and remaining said flood plains excavated at consecutively lower elevations with respect to said first flood plain;
   b) a water impermeable membrane disposed over each said flood plain;
   c) means, in fluid communication with a water source, for flooding said first flood plain with a selected volume of water from a water source;
   d) a plurality of flexible ducts forming dikes, wherein said plurality of dikes are disposed intermediate consecutive flood plains, and each said dike is in fluid communication with said water source and with one another, and said dikes are inflatable with water from said water source;
   e) a valve, in fluid communication with said water source, and disposed between consecutive dikes; and
   f) means, in fluid communication with said water source, for closing said valve for inflating said dikes for retaining said selected volume of water for a resident time, and for opening said valve for sequentially flooding each said remaining flood plain with said selected volume of water, in the first flood plain, for a resident time.

10. A flood irrigation system as defined in claim 9 further including a plurality of conduits interconnecting the dikes and wherein said valve includes a water receptacle disposed on each said conduit below each said dike, and said valve includes a means for closing said valve by filling said water receptacle simultaneously with the flooding of said flood plains above said valve means and said valve means includes means for opening said valve means by draining said receptacle.

11. A flood irrigation system as defined in claim 10 further including a retention pond, from which said selected volume of water is taken, and the retention pond having an elevation lower than the elevation of said flood plains for reclaiming said selected volume of water from said flood plains and water used to inflate said dikes.

12. A flood irrigation system as defined in claim 11 wherein each said dike includes the duct extending within a furrow of the respective said flood plain and a sheath attached to the membrane covering said duct.

13. A method for flood irrigation, comprising the steps of:
 a) providing a plurality of flood plains having therein a plurality of plants, said plurality of flood plains having a first flood plain excavated at a given elevation and said remaining flood plains excavated at consecutively lower elevations with respect to said first flood plain;
 b) providing a water impermeable membrane over each said flood plain;
 c) providing a plurality of dikes whereby each said dike is disposed between consecutive flood plains, and said dikes are flexible ducts, and said dikes are in fluid communication with a water source, and in fluid communication with one another;
 d) sequentially flooding said flood plains with a selected volume of water from said water source and each said flood plain being flooded with said selected volume of water for a resident time, and said first flood plain being flooded first and said selected volume of water is used to flood remaining said flood plains at consecutively lower elevations;
 e) inflating said dikes with water from said water source simultaneously as said flood plains are flooded with said selected volume of water, and maintaining said dikes inflated for said resident time; and
 f) deflating said dikes after being inflated for a resident time by draining water from a dike to a dike disposed along a flood plain at a consecutively lower elevation.

14. A method for flood irrigation as defined in claim 13 further comprising the step of reclaiming the selected volume of water from the flood plains after said flood plains have been flooded.

15. A method for flood irrigation as defined in claim 14 further comprising the step of reclaiming the water used to inflate the dikes, after the selected volume water has been used to flood said plurality of said flood plains.

16. A method for flood irrigation as defined in claim 15 wherein said water reclamation step includes providing a water retention pond at an elevation lower than the elevation of said flood plains.

17. A flood irrigation apparatus comprising:
 a first flood plain;
 a second flood plain;
 a source of water in fluid communication with the first flood plain through a fluid flow path and operable to deliver a volume of water to the first flood plain;
 a valve associated with the fluid flow path operable to retain the volume of water within the first flood plain for a first interval;
 a means for transferring the volume of water from the first flood plain into the second flood plain; and
 a valve associated with the second flood plain for retaining the volume of water within the second flood plain for a second interval.

18. The flood irrigation apparatus of claim 17, wherein the second flood plain is at a lower elevation than the first flood plain.

19. The flood irrigation apparatus of claim 18, wherein the source of water is at a lower elevation than the second flood plain, and further comprising:
 a conduit between the second flood plain and the source of water; and
 a pump operable to transfer water from the source of water to the first flood plain.

20. The flood irrigation apparatus of claim 17, further comprising a water impermeable membrane disposed on at least one of the first flood plain and the second flood plain.

21. A method for flood irrigation, the method comprising the steps of:
 providing a first flood plain;
 providing a second flood plain;
 delivering a single volume of water to the first flood plain;
 retaining the single volume of water within the first flood plain for a first interval;
 transferring the single volume of water from the first flood plain to the second flood plain; and
 retaining the single volume of water within the second flood plain for a second interval.

22. The method of claim 21, wherein the step of providing a second flood plain comprises providing a second flood plain at a lower elevation than the first flood plain.

23. The method of claim 21, further comprising the step of providing a water impermeable membrane on at least one of the first flood plain and the second flood plain prior to the step of delivering a volume of water to the first flood plain.

* * * * *